(12) United States Patent
Buter et al.

(10) Patent No.: US 6,509,408 B2
(45) Date of Patent: Jan. 21, 2003

(54) AQUEOUS CROSS-LINKABLE BINDER COMPOSITION AND COATING, LACQUER OR SEALING COMPOSITION COMPRISING SUCH A BINDER COMPOSITION

(75) Inventors: Roelof Buter, Dieren (NL); André Steenbergen, Arnhem (NL); Petrus Johannes Arnoldus Geurink, Voorhout (NL); Taco Scherer, Haarlem (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/861,928

(22) Filed: May 21, 2001

(65) Prior Publication Data

US 2002/0016407 A1 Feb. 7, 2002

(30) Foreign Application Priority Data

May 19, 2000 (EP) .............................. 00201761

(51) Int. Cl.$^7$ .............................. C08J 3/00; C08K 3/20; C08L 75/00; C08L 51/00; C08L 67/00

(52) U.S. Cl. ..................... 524/539; 525/123; 525/455; 525/127

(58) Field of Search ................................ 524/507, 539; 525/123, 127, 455

(56) References Cited

U.S. PATENT DOCUMENTS

| | | | |
|---|---|---|---|
| 5,268,412 A | 12/1993 | Raynolds | 524/513 |
| 5,336,711 A | 8/1994 | Schneider et al. | 524/507 |
| 5,541,251 A | 7/1996 | Bontinck et al. | 524/507 |
| 5,648,410 A | 7/1997 | Hille et al. | 523/501 |

FOREIGN PATENT DOCUMENTS

| | | | |
|---|---|---|---|
| WO | WO 94/13720 | 6/1994 | C08F/283/01 |
| WO | WO 97/19118 | 5/1997 | C08F/291/00 |
| WO | WO 00/39181 | 7/2000 | C08G/18/62 |

*Primary Examiner*—Patrick D. Niland
(74) *Attorney, Agent, or Firm*—Joan M. McGillycuddy

(57) ABSTRACT

Aqueous-based cross-linkable binder composition comprising (A) an aqueous dispersion of a polyester-polyacrylate hybrid resin 50 to 90 wt. % of which is composed of polyester and 10 to 50 wt. % of which is composed of polyacrylate, which hybrid resin is obtainable by grafting a composition of radically polymerisable unsaturated monomers onto a partially unsaturated hydroxy-functional polyester resin, and (B) an organic polyisocyanate, wherein
the partially unsaturated hydroxy-functional polyester is obtainable by reaction of a mixture of polycarboxylic and, optionally, monocarboxylic acids, and one or more (cyclo)aliphatic alcohols, wherein 0.5–6 mole % of the acids or alcohols are ethylenically unsaturated, and
the composition of radically polymerisable unsaturated monomers comprises a mixture of hydrophobic and hydrophilic monomers, wherein
(a) the hydrophobic monomers are selected from the group of aromatic vinyl compounds and (cyclo)alkyl(meth)acrylates with 4 or more carbon atoms in the (cyclo)alkyl group, and
(b) the hydrophilic monomers are selected from the group of (meth)acrylic acid, (meth)acrylamide, (meth)acrylonitrile, optionally substituted; unsaturated monomers containing a sulphonic acid salt group; hydroxyalkyl(meth)acrylates; and, optionally, unsaturated monomers containing nonionic groups such as $C_1$–$C_4$ alkoxy polyalkylene oxide groups, wherein the molar ratio of unsaturated carboxylic acid groups to unsaturated sulphonic acid groups is between 1:1 and 4:1, the molar ratio of components (a) to components (b) is between 1:2 and 3:1, the COOH value is between 20 and 80, and the $SO_3H$ value is between 10 and 40, and the carboxylic acid groups are at least partly neutralised, a coating composition comprising such a binder composition, a process for the production of coating compositions consisting of said aqueous binder composition and, optionally, auxiliaries and additives known from lacquer technology, and a cross-linked coated substrate prepared by applying such a coating composition.

16 Claims, No Drawings

AQUEOUS CROSS-LINKABLE BINDER COMPOSITION AND COATING, LACQUER OR SEALING COMPOSITION COMPRISING SUCH A BINDER COMPOSITION

CROSS REFERENCE TO RELATED APPLICATION

This application claims priority of European Application No. 00201761.4, filed on May 19, 2000.

BACKGROUND OF THE INVENTION

1. Field of the Invention

The invention relates to an aqueous-based cross-linkable binder composition comprising (A) an aqueous dispersion of a polyester-polyacrylate hybrid resin 50 to 90 wt. % of which is composed of polyester and 10 to 50 wt. % of which is composed of polyacrylate, which hybrid resin is obtainable by grafting a composition of unsaturated monomers onto a partially unsaturated hydroxy-functional polyester resin, and (B) an organic polyisocyanate, and to its use for the production of a coating, lacquer or sealing composition.

2. Discussion of the Prior Art

Two-component aqueous-based binder compositions based on hydroxyl-functional polyester-polyacrylate hybrid resins and organic polyisocyanates are known from, int. al., WO 97/19118 and WO 94/13720.

WO 97/19118 discloses a water-dissipatable polymer comprising an at least partially unsaturated polyester having a molecular weight between 300 and 3,000, an OH number between 20 and 300, and an acid number <5 mg KOH/g, onto which polyester a sulphonic acid salt groups-containing acrylic polymer has been grafted. A drawback to the aqueous-based coating compositions disclosed therein is that they suffer from excessive foaming when applied via spraying.

WO 94/13720 discloses a polymer dispersion based on polyester and acrylate having a solids content of between 30 and 55% by weight which can be obtained by free-radical polymerisation of from 80 to 20% by weight of at least (a) one (meth)acrylic acid ester of mono- or polyalcohols wherein said esters can additionally contain free hydroxyl groups; and (b) one ethylenically unsaturated, at least monofunctional acid; and optionally (c) an ethylenically unsaturated monomer which is distinct from (a) and (b) or mixtures thereof, with from 20 to 80% by weight of a free-radical polymerisable polyester resin having from 0.2 to 1.5 polymerisable double bonds per molecule, obtainable by the polycondensation of at least divalent polyalcohols with at least divalent polycarboxylic acids or their derivatives in the presence of polyalcohols and/or polycarboxylic acids containing at least one polymerisable double bond.

However, if such polymer dispersions of aqueous organic polyester-acrylate polyols are combined with polyisocyanates, the presence of organic amines used for at least partially neutralising the carboxylic acids can catalyse the undesired reaction between water and isocyanate. This produces carbon dioxide, which can foam, leading to undesirable effects, such as imperfections in a coating layer. Accordingly, a drawback to the known aqueous-based coating compositions is that either their pot life is open to improvement or they cause excessive foaming during spraying.

The invention now provides aqueous-based binder compositions which do not detract from the performance due to excessive foaming and which have an acceptable pot life and cure speed, which compositions comprise aqueous polyester-polyacrylate hybrid dispersions having a solids content of more than 30% by weight at a viscosity of 0.1 to 5 Pa.s and an organic polyisocyanate.

SUMMARY OF THE INVENTION

The invention provides aqueous-based cross-linkable binder compositions comprising (A) an aqueous dispersion of a polyester-polyacrylate hybrid resin 50 to 90 wt. % of which is composed of polyester and 10 to 50 wt. % of which is composed of polyacrylate, which hybrid resin is obtainable by grafting a composition of radically polymerisable unsaturated monomers onto a partially unsaturated hydroxy-functional polyester resin, and (B) an organic polyisocyanate, characterised in that the partially unsaturated hydroxy-functional polyester has a hydroxyl value of 50 to 350, a COOH value of at most 10 mg KOH/g, and a number average molecular weight, optionally after chain extension with a polyisocyanate, of from 400 to 3,000, and is obtainable by reaction of a mixture of polycarboxylic and, optionally, monocarboxylic acids, at least 50 mole % of such poly- and/or monocarboxylic acids are aliphatic acids with 6–12 carbon atoms, with one or more (cyclo)aliphatic alcohols comprising an aliphatic and/or a cycloaliphatic diol, wherein 0.5–6 mole % of the acids and/or alcohols are ethylenically unsaturated, and, optionally, a mono- and/or bisepoxide, and/or a tri- or higher-functional polyacid and/or polyalcohol, and the composition of radically polymerisable unsaturated monomers comprises a mixture of hydrophobic and hydrophilic monomers, wherein (a) the hydrophobic monomers are selected from the group of aromatic vinyl compounds and (cyclo)alkyl (meth)acrylates with 4 or more carbon atoms in the (cyclo)alkyl group, and (b) the hydrophilic monomers are selected from the group of (meth)acrylic acid, (meth)acrylamide, (meth) acrylonitrile, optionally substituted, unsaturated monomers containing a sulphonic acid salt group, hydroxyalkyl(meth)acrylates, and, optionally, unsaturated monomers containing nonionic groups such as $C_1$–$C_4$ alkoxy polyalkylene oxide groups, wherein the molar ratio of unsaturated carboxylic acid groups to unsaturated sulphonic acid groups is between 1:1 and 4:1, the molar ratio of components (a) to components (b) is between 1:2 and 3:1, the COOH value is between 20 and 80, and the $SO_3H$ value is between 10 and 40, and wherein the carboxylic acid groups are at least partly neutralised.

DETAILED DESCRIPTION OF THE INVENTION

It should be considered highly surprising that by making use of these very specific compositions for the polyester and the polyacrylate in the proposed hybrid resins of the invention, both the pot life and the cure speed of coating compositions containing said resins remain within the envisaged targets.

The same holds for the spraying properties of coating compositions containing said hybrid resins, which do not suffer from excessive foaming. The hybrid resins according to the invention provide stable, aqueous coating compositions which, when cured, provide high-quality coatings.

Coating compositions prepared from such binder compositions according to the invention are further characterised by properties such as excellent hardness, chemical resistance, water resistance, distinctness of image (DOI), and gloss.

Further provided according to the invention are a cross-linked coating which has been derived from such a coating composition and a coated substrate which has been prepared by applying a coating composition as defined hereinbefore on a substrate, causing or allowing the aqueous-based carrier phase of the composition to be removed, and generating cross-linking of the coating that has been applied on the substrate.

The partially unsaturated hydroxy-functional polyester of the polyester-polyacrylate hybrid resin according to the invention can be prepared using conventional polymerisation procedures known to be effective for polyester synthesis. The reaction to form the partially unsaturated hydroxy-functional polyester may be conducted in one or more stages. Preferably, the polyester is a branched polyester. In order to obtain a branched polyester, the condensation reaction is carried out in the presence of a branching agent, which may be a tri- or higher-functional acid and/or alcohol. For the tri- or higher-functional acid preference is given to an acid selected from the group of trimellitic acid and pyromellitic acid or the anhydride thereof. For the tri- or higher-functional polyalcohol preference is given to a polyalcohol selected from the group of 1,1,1-trimethylol propane, 1,1,1-trimethylol ethane, 1,2,3-trimethylol propane, pentaerythritol, and mixtures thereof. More preferred is the use of a tri- or higher-functional polyalcohol. Most preferred is the use of 1,1,1-trimethylol propane.

Suitable polycarboxylic acids for obtaining excellent hydrolytic stability as well as excellent mechanical properties are aromatic dicarboxylic acids such as isophthalic acid, terephthalic acid, dimethyl terephthalate, cycloaliphatic dicarboxylic acids such as 1,2-, 1,3-, or 1,4-cyclohexane dicarboxylic acid, camphoric acid, and hexahydrophthalic anhydride or mixtures thereof. Suitable aliphatic dicarboxylic acids and/or aliphatic monocarboxylic acids with, preferably, at least 6 carbon atoms include azelaic acid, sebacic acid, isononanoic acid, decanoic acid, 2-ethylhexyl carboxylic acid, dimethylol propionic acid, and dodecanoic acid or mixtures thereof.

The (poly)alcohols may comprise aliphatic diols, preferably with at least 4 carbon atoms, and cycloaliphatic diols, preferably with at least 4 carbon atoms.

Suitable diols for the preparation of the hydroxyl-functional polyester are diols having at least 4 carbon atoms such as 1,4-butane diol, 1,6-hexane diol, 2,2-dimethyl-1,3-propane diol, 2-ethyl-2-propyl-1,3-propane diol, 1,2-, 1,3-, and 1,4-cyclohexane diols, the corresponding cyclohexane dimethanol, and mixtures thereof.

Optionally, monoalcohols may be used in the preparation of the polyester resin. Examples of mono-alcohols include n-hexanol, 2-ethyl hexanol, cyclohexanol, tert. butyl cyclohexanol, stearyl alcohol, dodecanol, and mixtures thereof.

The partially unsaturated hydroxy-functional polyester may further contain a mono- and/or bisepoxide. Particularly suitable epoxy-containing compounds are glycidyl

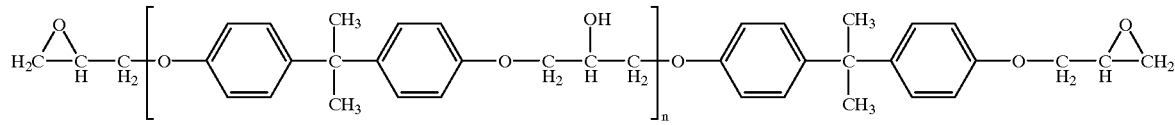

In order to achieve hydroxyl functionality in the resulting polyester, a stoichiometric excess of the hydroxyl component should be used. The hydroxyl value of the polyester may be increased further by the incorporation of a branching agent. Preferably, the polyester has an average hydroxyl functionality of >2, more preferably >2.3, and most preferably >2.5.

If desired, the polyester may also contain urethane groups by chain extension with a diisocyanate such as hexamethylene diisocyanate or isophorone diisocyanate, and may further be provided with a proportion of carbonylamino linking groups —C(=O)—NH— (i.e. amide linking group) by including an appropriate amino-functional reactant as part of the "hydroxyl component" (such amide linkages are in fact useful in that they are more hydrolysis-resistant and more hydrophilic).

The (poly)carboxylic acids may comprise m-aromatic dicarboxylic acids, p-aromatic dicarboxylic acids, cycloaliphatic dicarboxylic acids, aliphatic dicarboxylic acids, preferably with more than 6 carbon atoms, more preferably with 6 to 12 carbon atoms, and aliphatic monocarboxylic acids, preferably with more than 6 carbon atoms, more preferably with 6 to 12 carbon atoms, or mixtures thereof. At least 50 mole % of the mono- and/or polycarboxylic acids should be aliphatic acids with 6 to 12 carbon atoms, preferably 60–100 mole %, more preferably 65–100 mole %.

ethers, such as alkyl glycidyl ethers, for example, butyl glycidyl ether and 2-ethylhexyl glycidyl ether; glycidyl esters, including glycidyl esters of carboxylic acids, for example, glycidyl esters of α, α-dimethyl octanoic acid, and the glycidyl ester of Versatic acid (available as Cardura®E-10 ex Shell) or bisepoxide compounds based on bisphenol A according to the following formula
wherein n ranges from 0 to 5, preferably 0 to 3. An example thereof is the bisepoxide Epikote 828 ex Shell. The introduction of a mono- and/or bisepoxide results in the reduction of the COOH value.

The partially unsaturated hydroxy-functional polyester used in the polyester-polyacrylate hybrid resin according to the invention may be obtained by direct esterification of the constituent components, a portion of which may already have been converted into ester diols or polyester diols.

The polycondensation reaction is generally carried out in the presence of a catalyst such as ortho-phosphoric acid or an Sn-based catalyst at a temperature in the range of 150° to 230° C.

The polycondensation reaction may be carried out in a solvent to remove water azeotropically. Suitable solvents include xylene, toluene, and mixtures thereof.

Alternatively, the polyester may be prepared by adding a (poly)alcohol to a reaction mixture of one or more (poly)carboxylic acids and one or more mono- and/or bisepoxide compounds at an elevated temperature in the presence of a catalyst. Suitable (poly)carboxylic acids include the ones mentioned above. Suitable epoxide compounds include the ones mentioned above. Suitable catalysts include triphenyl benzyl phosphonium chloride and Cr(III)-2-ethyl hexanoate. Suitable (poly)alcohols include the ones mentioned above.

For the incorporation of ethylenically unsaturated groups into the partially unsaturated hydroxy-functional polyester use is made of unsaturated monomers in an amount of 0.5–6 mole % of acids and/or alcohols, preferably 1–5 mole %, more preferably 1–3.5 mole %. Particularly preferred unsaturated monomers are unsaturated acids, unsaturated alcohols, unsaturated fatty acids and derivatives thereof such as anhydrides or esters, in particular, conjugated unsaturated fatty acids. Unsaturation may also be provided after the polymer formation by an unsaturated monoisocyanate, for example dimethyl-m-isopropenyl benzyl isocyanate. It is also possible to prepare a carboxylic acid groups-containing polyester, followed by reaction with an oxiran groups-containing monomer such as allyl glycidyl ether or glycidyl methacrylate.

Examples of unsaturated alcohols are glycerol monoallyl ether, trimethylol propane monoallyl ether, butene diol and/or dimethylol propionic acid monoallyl ether.

Examples of unsaturated acids include maleic acid, muconic acid, crotonic acid, citraconic acid, and itaconic acid. Preference is given to a partially unsaturated hydroxy-functional polyester containing 0.05 to 0.5 ethylenically unsaturated group per molecule.

The polyester resin has a carboxylic acid number of $\leq 10$ mg KOH/g, preferably $\leq 7$ mg KOH/g, more preferably $\leq 5$ mg KOH/g. The polyester resin has a hydroxyl number of 50 to 350 mg KOH/g, preferably 100 to 350 mg KOH/g, more preferably 150 to 350 mg KOH/g. The polyester resin has a number average molecular weight within the range of from 400 to 3,000, preferably 750 to 2,500, more preferably 1,000 to 2,000.

The polyester-polyacrylate hybrid resin is obtained by the addition polymerisation of radically polymerisable unsaturated monomers in the presence of the partially unsaturated hydroxy-functional polyester described hereinbefore. In this process, the addition polymer is linked to the polyester resin by means of grafting onto the unsaturated groups in the polyester. Where the term "grafting" is used in this application, an addition polymerisation reaction to a degree of more than 0% (to a maximum of 100%) of radically polymerisable monomers on the unsaturated bonds in the polyester resin is meant.

The graft polymerisation of the radically polymerisable unsaturated monomers in the presence of the partially unsaturated hydroxy-functional polyester resin is generally carried out in an inert atmosphere (e.g., of nitrogen) in the presence of a radical initiator. The reaction is preferably carried out in a water-miscible organic solvent at a temperature in the range of 60° to 200° C. The amount of organic solvent usually is in the range of 0 to 30 wt. %, calculated on the overall reaction mixture. Suitable examples of such a solvent are glycol ethers and propylene glycol ethers, such as methoxypropanol, butoxyethanol, isopropanol, diethylene glycol monobutyl ether, diethylene glycol monomethyl ether, dipropylene glycol monomethyl ether, propoxypropanol, diethylene glycol dimethyl ether, and N-methyl pyrrolidone. In addition, there may be small amounts of water-immiscible organic solvents, such as ethylmethyl ketone and methyl isobutyl ketone.

Suitable radical initiators include: dibenzoyl peroxide, dicumyl peroxide, methylethyl ketone peroxide, cumene hydroperoxide, tert. butyloxy-2-ethyl hexanoate, tert. butyl perbenzoate, tert. butyl cumyl peroxide, di-tert. butyl peroxide, di-tert. butyl peroxy-3,5,5-trimethyl cyclohexane, and 1,3-bis(tert. butyl)peroxy isopropyl benzene. Also suitable are mixtures of the aforementioned initiators. The selected amount thereof to be used is commonly in the range of about 0.05 to 10 wt. %, preferably in the range of 1 to 5 wt. %, calculated on the overall weight of the monomer mixture.

A wide range of radically polymerisable unsaturated monomers is available to choose from for the addition polymer chains. The composition of unsaturated monomers comprises a mixture of hydrophobic and hydrophilic monomers.

Examples of unsaturated hydrophobic monomers are aromatic vinyl compounds such as styrene, vinyl toluene, α-methyl styrene, and vinyl naphthalene, and (cyclo)alkyl (meth)acrylates having 4 or more, preferably from 4 to about 12 carbon atoms in the (cyclo)alkyl group, such as butyl (meth)acrylate, 2-ethylhexyl (meth)acrylate, octyl (meth)acrylate, isobornyl (meth)acrylate, dodecyl (meth)acrylate, and cyclohexyl (meth)acrylate. Preferred unsaturated hydrophobic monomers include styrene and 2-ethylhexyl acrylate Examples of unsaturated hydrophilic monomers are (meth)acrylic acid, (meth)acrylamide and (meth)acrylonitrile, optionally substituted; unsaturated monomers containing a sulphonic acid salt group; hydroxyalkyl (meth)acrylates; and monomers containing nonionic groups such as $C_1$–$C_4$ alkoxy polyalkoxy alkylene (meth)acrylates. Examples of substituted (meth)acrylic acid, (meth)acrylamide and (meth)acrylonitrile monomers include N-alkyl (meth)acrylamides and N-methylol(meth)acrylamide.

Examples of hydroxyalkyl (meth)acrylates include 2-hydroxyethyl (meth)acrylate, 2-hydroxypropyl (meth)acrylate, 4-hydroxybutyl acrylate, 6-hydroxyhexyl acrylate, and p-hydroxypolypropylene glycol (meth)acrylate. Examples of unsaturated sulphonic acid salt groups-containing monomers include styrene sulphonic acid, dodecyl allyl sulphosuccinate, and 2-acrylamido-2-methyl propane sulphonic acid neutralised with a neutralising agent such as an amine or alkali metal salt, preferably, an amine or sodium hydroxide. The amine compound may be selected from the group of tertiary amine compounds known by the skilled person to stabilise sulphonic acid groups, such as dimethyl ethanolamine, triethyl amine. The amine compound may be weighed in with the sulphonic acid compound and neutralises the sulphonic acid group, so making the sulphonic acid compound dispersible in the monomer mixture, or it may be added to the monomer mixture already comprising the sulphonic acid compound. Thus far, optimum results have been obtained with a binder composition wherein the sulphonic acids are selected from the dimethyl ethanolamine salt of styrene sulphonic acid, the dimethyl ethanolamine salt of dodecyl allyl sulphosuccinate, sodium dodecyl allyl sulphosuccinate, and sodium 2-acrylamido-2-methyl propane sulphonic acid.

Examples of unsaturated monomers containing a nonionic group include $C_1$–$C_4$ alkoxy polyalkylene oxide acrylate or methacrylate or the reaction product of 1 mole of dimethyl-m-isopropenyl benzyl isocyanate and 1 mole of a $C_1$–$C_4$ alkoxy polyalkylene oxide amine. The preferred alkylene oxide groups are ethylene oxide groups, but alternatively propylene oxide groups or mixtures of ethylene oxide and propylene oxide groups are useful as well. For example, the alkylene oxide groups may be $C_1$–$C_4$ alkoxy ethers of polyalkylene glycols with the structure:

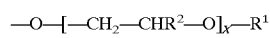

wherein $R^1$ is a hydrocarbon radical with 1 to 4, preferably 1 or 2, carbon atoms; $R^2$ is a H atom or a methyl group; x is between 2 and 50, preferably between 2 and 25. The distribution of the alkylene glycols may be random, alternating or blocked. Examples are $C_1$–$C_4$ alkoxy poly$C_2(C_3)$ alkylene oxide glycol and/or $C_1$–$C_4$ alkoxy poly$C_2(C_3)$ alkylene oxide 1,3-diol, wherein poly$C_2(C_3)$ alkylene oxide stands for polyethylene oxide, optionally comprising propylene oxide units. Preferably, the polyester-polyacrylate hybrid comprises up to 15 wt. % $C_1$–$C_4$ alkoxy polyalkylene oxide groups with a number average molecular weight of 500 to 3,000, preferably between 500 and 1,500, most preferably between 500 and 1,250, while preference is given to a polyester-polyacrylate hybrid comprising 1 to 10 w. % of $C_1$–$C_4$ alkoxy polyalkylene oxide groups. Good results are obtained with a polyester-polyacrylate hybrid wherein the polyalkylene oxide units are polyethylene oxide units.

Preferred are the reaction products of 1 mole of dimethyl-m-isopropenyl benzyl isocyanate and 1 mole of a $C_1$–$C_4$ alkoxy polyalkylene oxide amine, where the amine is selected from the methoxypolyoxy ethylene/polyoxy propylene amines, which are available from Texaco under the tradename Jeffamine®, such as Jeffamine® M-1000 (PO/EO=$3/19$, Mn=1,176) and Jeffamine® M-2070 (PO/EO=$10/32$, Mn=2,200).

The molar ratio of unsaturated carboxylic acid groups to unsaturated sulphonic acid groups in the polyester-polyacrylate hybrid is between 1:1 and 4:1, preferably between 2:1 and 3:1. The molar ratio of hydrophobic monomers to hydrophilic monomers in the polyester-polyacrylate hybrid is between 1:2 and 3:1, preferably between 1:1 and 2:1.

Further, preference is given to a binder composition wherein the hydroxyl value of the polyacrylate is between 40 and 250 mg KOH/g, preferably between 50 and 150 mg KOH/g. Thus far, optimum results have been obtained with a binder composition wherein the polyacrylate has a COOH value between 20 and 80 mg KOH/g, preferably 20 and 60 mg KOH/g, an $SO_3H$ value between 10 and 40 mg KOH/g, preferably 10 and 30 mg KOH/g, and which comprises up to 15 wt. % of a nonionic group. The OH, COOH, and $SO_3H$ values of the polyacrylate part of the hybrid resin are (calculated) theoretical values.

Though above the sulphonic acid and nonionic stabilising groups are incorporated into the polyacrylate part of the hybrid resin, it is also possible to incorporate such groups into the polyester part of the hybrid resin.

At the end of the grafting reaction of the acrylate monomers onto the polyester resin, the carboxylic acid groups of the polyester-polyacrylate hybrid may be neutralised with ammonia, an amine and/or an alkali metal salt, after which water is added, preferably to the hot melt at a temperature starting at 100° to 110° C., after which the temperature is gradually lowered to ambient. The aqueous polyester-polyacrylate hybrid dispersion obtained in this manner has a solids content of 30 to 65 wt. %, preferably 35 to 60 wt. %, more preferably 38 to 48 wt. %, at a viscosity up to 5 Pa.s, preferably 0.2 to 3 Pa.s, more preferably 0.4 to 2 Pa.s. The average particle size of the thus obtained dispersion is in the range of 30 to 300 nm, and preferably in the range of 50 to 200 nm.

The polyester-polyacrylate hybrid resin has a hydroxyl number of 25 to 400 mg KOH/g, preferably 100 to 300 mg KOH/g. The polyester-polyacrylate hybrid resin has a carboxylic acid number of 1 to 40 mg KOH/g, preferably 3 to 25 mg KOH/g, more preferably 5 to 20 mg KOH/g. The polyester-polyacrylate hybrid resin has a sulphonate number of 0.5 to 15 mg KOH/g, preferably 1 to 10 mg KOH/g, more preferably 2.5 to 7.5 mg KOH/g. Generally, preference is given to a polyester-polyacrylate hybrid resin dispersion wherein the pH of the aqueous dispersion is between 6 and 9, and preferably between 7 and 8.5.

The polyester-polyacrylate hybrid comprises 50 to 90 wt. % polyester and 10 to 50 wt. % polyacrylate, preferably 55 to 85 wt. % polyester and 15 to 45 wt. % polyacrylate.

Examples of neutralising alkali metal salts include LiOH, KOH, and NaOH. Examples of suitable neutralising amines include primary, secondary, and tertiary amines. Suitable amines are, for example, isopropyl amine, butyl amine, ethanol amine, 3-amino-1-propanol, 1-amino-2-propanol, 2-amino-2-methyl-1-propanol or 2-amino-2-methyl-1,3,-propane diol. Secondary amines that can be used are, for example, morpholine, diethyl amine, dibutyl amine, N-methyl ethanolamine, diethanol amine, or diisopropanol amine. Examples of suitable tertiary amines include trimethyl amine, triethyl amine, triisopropyl amine, triisopropanol amine, N,N-dimethyl ethanolamine, dimethyl isopropyl amine, N,N-diethyl ethanolamine, 1-dimethyl amino-2-propanol, 3-dimethyl amino-1-propanol, 2-dimethyl amino-2-methyl-1-propanol, N-methyl diethanolamine, N-ethyl diethanolamine, N-butyl diethanolamine, N-ethyl morpholine. Tertiary amines are preferred. More preferred is N,N-dimethyl ethanolamine.

The organic polyisocyanate (component B) includes hydrophobic polyfunctional, preferably free polyisocyanates with an average NCO functionality of more than 2, preferably 2.5 to 5, and may be (cyclo)aliphatic, araliphatic or aromatic in nature. Preferably, the polyisocyanate component B) has a viscosity at 22° C. of 0.1 to 5 Pa.s The polyisocyanate may include biuret, urethane, uretdione, and isocyanurate derivatives. Examples of a polyisocyanate include 1,6-hexane diisocyanate, 2,4-toluene diisocyanate, 2,6-toluene diisocyanate, diphenyl methane-diisocyanate, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylene diisocyanate, 1,4-xylylene diisocyanate, 1-isocyanato-3-(isocyanato methyl)-1-methyl cyclohexane, m-α,α-α',α'-tetramethyl xylylene diisocyanate, 1,8-diisocyanato-4-(isocyanatomethyl)octane, isophorone diisocyanate or bis (isocyanate cyclohexyl) methane, and the above-mentioned derivatives thereof and mixtures thereof. Normally, these products are liquid at ambient temperature and commercially available in a wide range. Preferred are cyclic trimers (isocyanurates) of 1,6-hexane diisocyanate and isophorone diisocyanate. Usually these compounds contain small quantities of their higher homologues. Also, isocyanate adducts may be used. Examples thereof are the adduct of 3 moles of toluene diisocyanate to 1 mole of trimethylol propane, the adduct of 3 moles of m-α,α-α',α',-tetramethyl xylene diisocyanate to 1 mole of trimethylol propane. Optionally, a hydrophilic polyisocyanate may be partially substituted for the hydrophobic polyisocyanate. Such a hydrophillic polyisocyanate may be a polyisocyanate compound substituted with non-ionic groups, such as the above-mentioned $C_1$–$C_4$ alkoxy polyalkylene oxide groups. Preferably 1 to 30 wt. % of non-ionic groups will be present on the total solid polyisocyanate compound, i.e. the organic, hydrophobic, and hydrophilic polyisocyanate, more preferably 2 to 20 wt. %, most preferably 5 to 15 wt. %. Preferred are the isocyanurates of 1,6-hexane diisocyanate and isophorone diisocyanate substituted with methoxypolyethylene glycol.

The polyisocyanate and the aqueous polyester-polyacrylate hybrid dispersion should be mixed in such a ratio that the NCO:OH ratio is in the range of 0.5–3:1, preferably 0.75–2.5:1, and more preferably 1–2:1.

Polyisocyanate B), and, optionally, the hydrophilic polyisocyanate may be mixed into component A) by any suitable technique. However, simple stirring is usually sufficient. Sometimes it can be useful to dilute the polyisocyanate somewhat with an organic solvent like ethyl acetate or 1-methoxy-2-propyl acetate to reduce its viscosity.

The binder composition may contain catalysts like amines and Sn-based catalysts. Examples thereof include dibutyl tin dilaurate and dibutyl tin diacetate. The pot life at ambient temperature usually is between 2 and 10 hours, depending on the use of the catalysts and their amount. The pot life is determined by the appearance of the sprayed film.

The coating compositions may further comprise other ingredients, additives or auxiliaries, such as other polymers or polymer dispersions, pigments, dyes, emulsifiers (surfactants), pigment dispersion aids, wetting agents, levelling agents, anti-cratering agents, antifoaming agents, antisagging agents, heat stabilisers, UV absorbers, antioxidants, and fillers.

Suitable types of other polymer dispersions include acrylic polymer emulsions and aqueous polyurethane dispersions.

Also included in the binder or coating compositions of the invention may be reactive diluents such as water-soluble mono- or (preferably) polyhydric alcohols. Examples of monohydric alcohols include hexyl glycol, butyoxyethanol, 1-methoxy-propanol-2, 1-ethoxy-propanol-2, 1-propoxy-propanol-2, 1-butoxy-propanol-2, 2-methoxybutanol, 1-isobutoxy-propanol-2, dipropylene glcyol monomethyl ether, diacetone alcohol, methanol, ethanol, propanol, isopropanol, butanol, 2-butanol, pentanol, hexanol, benzyl alcohol, Guerbet alcohol, and mixtures thereof. Examples of polyhydric alcohols include ethylene glycol, diethylene glycol, propylene glycol, isomeric butane diols, the polyethylene oxide glycols or polypropylene oxide glycols, trimethylol propane, pentaerythritol, glycerol, and mixtures thereof.

The composition of the present invention consists essentially of water, being an aqueous composition. However, about 20 wt. % of liquid content of the composition may be an organic solvent. As suitable organic solvents may be mentioned dimethyl dipropylene glycol, methyl ether of diacetone alcohol, ethyl acetate, butyl acetate, ethyl glycol acetate, butyl glycol acetate, 1-methoxy-2-propyl acetate, butyl propionate, ethoxyethyl propionate, toluene, xylene, methylethyl ketone, methylisobutyl ketone, methylamyl ketone, ethylamyl ketone, dioxolane, N-methyl-2-pyrrolidone, dimethyl carbonate, propylene carbonate, butyrolactone, caprolactone, and mixtures thereof. The VOC of the composition may range from 0 to 400 g/l, preferably from 0 to 250 g/l.

The coating composition of the present invention may be applied to any substrate. The substrate may be, for example, metal, plastic, wood, glass, ceramic material, or some other coating layer. The other coating layer may be comprised of the coating composition of the invention or it may be a different coating composition. The coating compositions of the invention show particular utility as clear coats, base coats, pigmented top coats, primers, and fillers. The coating compositions can be applied by conventional means such as by spray gun, brush, or roller, with spraying being preferred. Curing temperatures preferably are between 0° and 80° C. and more preferably between 10° and 60° C. The compositions are particularly suitable in the preparation of coated metal substrates, such as in the refinish industry, in particular the body shop, to repair automobiles and transportation vehicles, and in finishing large transportation vehicles such as trains, trucks, buses, and aeroplanes.

Preferred is the use of the coating composition of the present invention as a clear coat. Clear coats are required to be highly transparent and must adhere well to the base coat layer. It is further required that the clear coat does not change the aesthetic aspect of the base coat by strike-in, i.e. discolouration of the base coat due to its solvation by the clear coat composition, or by yellowing of the clear coat upon outdoor exposure. A clear coat based on the coating composition of the present invention does not have these drawbacks.

In the case of the coating composition being a clear coat, the base coat may be a conventional base coat known in the coating art. Examples are solvent borne base coats, e.g., Autobase® ex Akzo Nobel Coatings, based on cellulose acetobutyrate and acrylic resins, and water borne base coats, e.g., Autowave® ex Akzo Nobel Coatings, based on an acrylic resin dispersion. Furthermore, the base coat may comprise pigments (colour pigments, metallics and/or pearls), wax, solvents, flow additives, neutralising agent, and defoamers. Also high-solids base coats can be used. These are, for instance, based on polyols, imines, and isocyanates. The clear coat composition is applied to the surface of a base coat and then cured. An intermediate curing step for the base coat may be introduced.

The invention will be illustrated with reference to the following examples. Of course these examples are submitted for a better understanding of the invention only; they are not to be construed as limiting in any manner the scope thereof.

EXAMPLES

In the following examples, the preparation of a number of water borne polyester-polyacrylate dispersions and binder compositions according to the invention are disclosed. The properties measured on these dispersions are listed in Table 1. The dispersions' respective average particle size given in this table was determined with the aid of dynamic light scattering, with the dispersions diluted to a solids content of about 0.1 wt. %. The viscosity was determined with a Brookfield viscometer (LV-3; 60 revolutions per minute). The solids content was determined in accordance with ASTM method No. 1644-59, with heating to 140° C. over a period of 30 minutes. The Mn was measured with GPC with polystyrene as standard.

Preparation of Partially Unsaturated Polyesters
Polyester A

A 6 l flask fitted with a stirrer, a thermometer, a reflux condenser, and a nitrogen inlet was charged with a mixture composed of:

| | |
|---|---|
| 1,414 g | of sebacic acid |
| 581 g | of isophthalic acid |
| 91 g | of itaconic acid |
| 1,008 g | of 1,4-cyclohexane dimethylol |
| 688 g | of neopentyl glycol |
| 469 g | of trimethylol propane |
| 4.2 g | of o-phosphoric acid (85% in water) |

After deaeration, the flask was brought under a nitrogen atmosphere. The contents of the flask were heated to 150° C., whereupon the temperature was gradually increased to 220° C. over a period of 6 hours. The temperature of 220° C. was maintained in the flask until the acid number (COOH value) of the obtained polyester was below 10 mg KOH/g.

After the collection of 440 ml water of distillation, the acid number of the obtained polyester resin was 6 mg KOH/g.

The practical OH value was 216 mg KOH/g, the Mn =1,175.

Polyester B

A 2 l flask fitted with a stirrer, a thermometer, a reflux condenser, a nitrogen inlet, and a dropping funnel was filled with 1,200 g of Polyester A.

The dropping funnel was charged with:

40 g of Cardura® E-1 0 (=the glycidyl ester of Versatic acid ex Shell).

The contents of the flask were heated to 180° C., at which temperature the contents of the dropping funnel were added to the contents of the flask over 30 minutes, after which the temperature of the reaction mixture was maintained at 180° C. for 3 hours. The acid number of the obtained polyester resin was 1.6 mg KOH/g, OH value was 210, the Mn=1,215.

Polyester C

In a manner analogous to that disclosed for polyester A, a polyester resin was prepared, with the proviso that this time the flask was charged with:

| | |
|---|---|
| 664 g | of isophthalic acid |
| 707 g | of sebacic acid |
| 65 g | of itaconic acid |
| 1,640 g | of trimethylol propane |
| 1,264 g | of isononanic acid |
| 4.3 g | of o-phosphoric acid (85% in water) |

The COOH value of the obtained polyester resin was 6.7 mg KOH/g, the practical OH value was 173, the Mn=1,990.

Polyester D

A 2 l flask fitted with a stirrer, a thermometer, a reflux condenser, a nitrogen inlet, and a dropping funnel was filled with 1,200 g of Polyester C.

The dropping funnel was charged with:

40 g of Cardura® E-10 (=the glycidyl ester of Versatic acid ex Shell).

The contents of the flask were heated to 180° C., at which temperature the contents of the dropping funnel were added to the contents of the flask over 30 minutes, after which the temperature of the reaction mixture was maintained at 180° C. for 3 hours. The acid number of the obtained polyester resin was 1.0 mg KOH/g, the OH value was 169, the Mn =2,050.

Polyester E

A 2 l flask fitted with a stirrer, a thermometer, a reflux condenser, a nitrogen inlet, and a dropping funnel was charged with a mixture composed of:

| | |
|---|---|
| 378.75 g | of sebacic acid |
| 16.25 g | of itaconic acid |
| 55.0 g | of o-xylene, and |
| 0.5 g | of Cr(III) - 2-ethyl hexanoate. |

The dropping funnel was filled with:

475 g of a 80% solution of Epikote® 828 (bisepoxide ex Shell) in o-xylene.

After deaeration the flask was brought under a nitrogen atmosphere and the contents of the flask were heated to 135° C. At this temperature the contents of the dropping funnel were added to the contents of the flask over a period of 2 hours. The temperature of the reaction mixture was then maintained at 135° C. for another 2 hours.

Subsequently, the following components were added to the reaction mixture:

| | |
|---|---|
| 268 g | of trimethylol propane, and |
| 0.2 g | of Fascat 4100 (Sn-based catalyst) | and the temperature of the reaction mixture was gradually increased to 200° C. over a period of 5 hours and maintained at 200° C. for 1 hour. During this time 36 ml water of distillation were collected. The reaction mixture was cooled to 180° C. and at this temperature the remaining o-xylene in the reaction mixture was distilled off under reduced pressure.

A polyester resin was obtained with an acid number <1 mg KOH/g, an OH value of 333 mg KOH/g, and an Mn =1,990.

Polyester F

In a manner analogous to that disclosed for polyester A, a polyester resin was prepared, with the proviso that this time the flask was charged with:

| | |
|---|---|
| 581 g | of isophthalic acid |
| 1,414 g | of sebacic acid |
| 91 g | of itaconic acid |
| 1,313 g | of trimethylol propane |
| 1,008 g | of 1,4-cyclohexane dimethanol |
| 4.2 g | of o-phosphoric acid (85% in water) |

After the collection of 402 g of distillate a polyester was obtained with an acid value of 6.6 mg KOH/g.

A dropping funnel was charged with 100 g of Cardura® E-10 (=the glycidyl ester of Versatic acid ex Shell).

The contents of the flask were heated to 180° C., at which temperature the contents of the dropping funnel were added to the contents of the flask over 30 minutes, after which the temperature of the reaction mixture was maintained at 180° C. for 3 hours. The COOH value of the obtained polyester resin was 4.1 mg KOH/g, the practical OH value was 294, and the Mn =1,206.

Polyester G

In a manner analogous to that disclosed for polyester A, a polyester resin was prepared, with the proviso that this time the flask was charged with:

| | |
|---|---|
| 313.7 g | of isophthalic acid |
| 707 g | of sebacic acid |
| 27.3 g | of itaconic acid |
| 344 g | of neopentyl glycol |
| 234.5 g | of trimethylol propane |
| 504 g | of 1,4-cyclohexane dimethanol |
| 2.1 g | of o-phosphoric acid (85% in water) |

After the collection of 231.4 g of distillate a polyester was obtained with an acid value of 6.8 mg KOH/g.

A dropping funnel was charged with 50 g of Cardura® E-10 (=the glycidyl ester of Versatic acid ex Shell).

The contents of the flask were heated to 180° C., at which temperature the contents of the dropping funnel were added to the contents of the flask over 30 minutes, after which the temperature of the reaction mixture was maintained at 180° C. for 3 hours. The COOH value of the obtained polyester resin was 3.3 mg KOH/g, the practical OH value was 216, and the Mn =1,287.

Polyester H

In a manner analogous to that disclosed for polyester A, a polyester resin was prepared, with the proviso that this time the flask was charged with:

| | | |
|---|---|---|
| 627.5 g | of isophthalic acid | |
| 1,414 g | of sebacic acid | |
| 54.6 g | of itaconic acid | |
| 1,313.2 g | of trimethylol propane | |
| 1,008 g | of 1,4-cyclohexane dimethanol | |
| 4.4 g | of o-phosphoric acid (85% in water) | |

After the collection of 408 g of distillate a polyester was obtained with an acid value of 6.0 mg KOH/g.

A dropping funnel was charged with 100 g of Cardura® E-10 (=the glycidyl ester of Versatic acid ex Shell).

The contents of the flask were heated to 180° C., at which temperature the contents of the dropping funnel were added to the contents of the flask over 30 minutes, after which the temperature of the reaction mixture was maintained at 180° C. for 3 hours. The COOH value of the obtained polyester resin was 3.8 mg KOH/g, the practical OH value was 293, and the Mn =1,189.

Compositions of Unsaturated Monomers

Composition I

A dropping funnel was filled with a homogeneous mixture of:

| monomer | mole |
|---|---|
| styrene | 0.30 |
| 2-ethylhexyl acrylate | 0.27 |
| 2-hydroxyethyl methacrylate | 0.25 |
| acrylic acid | 0.12 |
| 2-acrylamido-2-methylpropane sulphonic acid | 0.06 |
| N,N-dimethyl ethanolamine | 0.06 |
| ditert. butyl peroxide | 2.5 g |

The calculated COOH, $SO_3H$, and OH values of the resulting polyacrylate are:

| | |
|---|---|
| COOH value | 49.0 mg KOH/g |
| $SO_3H$ value | 24.5 mg KOH/g |
| OH value | 102 mg KOH/g |

Composition II

A dropping funnel was filled with a homogeneous mixture of:

| monomer | mole |
|---|---|
| styrene | 0.30 |
| 2-ethylhexyl acrylate | 0.30 |
| 2-hydroxyethyl methacrylate | 0.25 |
| acrylic acid | 0.10 |
| 2-acrylamido-2-methylpropane sulphonic acid | 0.05 |
| N,N-dimethyl ethanolamine | 0.05 |
| ditert. butyl peroxide | 2.5 g |

The calculated COOH, $SO_3H$, and OH values of the resulting polyacrylate are:

| | |
|---|---|
| COOH value | 40.3 mg KOH/g |
| $SO_3H$ value | 20.1 mg KOH/g |
| OH value | 101 mg KOH/g |

Composition III

A dropping funnel was filled with a homogeneous mixture of:

| monomer | mole |
|---|---|
| styrene | 0.335 |
| 2-ethylhexyl acrylate | 0.30 |
| 2-hydroxyethyl methacrylate | 0.25 |
| acrylic acid | 0.08 |
| 2-acrylamido-2-methylpropane sulphonic acid | 0.035 |
| N,N-dimethyl ethanolamine | 0.035 |
| ditert. butyl peroxide | 2.5 g |

The calculated COOH, $SO_3H$, and OH values of the resulting polyacrylate are:

| | |
|---|---|
| COOH value | 32.5 mg KOH/g |
| $SO_3H$ value | 14.2 mg KOH/g |
| OH value | 101 mg KOH/g |

Composition IV

A dropping funnel was filled with a homogeneous mixture of:

| monomer | mole |
|---|---|
| styrene | 0.341 |
| 2-ethylhexyl acrylate | 0.30 |
| 2-hydroxyethyl methacrylate | 0.25 |
| acrylic acid | 0.08 |
| 2-acrylamido-2-methylpropane sulphonic acid | 0.029 |
| N,N-dimethyl ethanolamine | 0.029 |
| ditert. butyl peroxide | 2.5 g |

The calculated COOH, $SO_3H$, and OH values of the resulting polyacrylate are:

| | |
|---|---|
| COOH value | 32.6 mg KOH/g |
| $SO_3H$ value | 11.8 mg KOH/g |
| OH value | 102 mg KOH/g |

Composition V

A dropping funnel was filled with a homogeneous mixture of:

| monomer | mole |
|---|---|
| styrene | 0.315 |
| 2-ethylhexyl methacrylate | 0.30 |
| 2-hydroxyethyl methacrylate | 0.25 |
| acrylic acid | 0.09 |
| 2-acrylamido-2-methylpropane sulphonic acid | 0.045 |
| N,N-dimethyl ethanolamine | 0.045 |
| ditert. butyl peroxide | 2.5 g |

The calculated COOH, $SO_3H$, and OH values of the resulting polyacrylate are:

| | |
|---|---|
| COOH value | 36.3 mg KOH/g |
| $SO_3H$ value | 18.2 mg KOH/g |
| OH value | 101 mg KOH/g |

Composition VI

A dropping funnel was filled with a homogeneous mixture of:

| monomer | mole |
|---|---|
| styrene | 0.35 |
| 2-ethylhexyl methacrylate | 0.30 |
| 2-hydroxyethyl methacrylate | 0.25 |
| acrylic acid | 0.07 |
| 2-acrylamido-2-methylpropane sulphonic acid | 0.03 |
| N,N-dimethyl ethanolamine | 0.03 |
| ditert. butyl peroxide | 2.5 g |

The calculated COOH, $SO_3H$, and OH values of the resulting polyacrylate are:

| COOH value | 28.4 mg KOH/g |
|---|---|
| $SO_3H$ value | 12.2 mg KOH/g |
| OH value | 101 mg KOH/g |

Preparation of a Polyester-polyacrylate Hybrid Dispersion

Example 1

A 2 l flask fitted with a stirrer, a thermometer, a reflux condenser, and a dropping funnel was filled with:

| 300 g of Polyester A and |
|---|
| 20 g of 1-methoxy propanol-2. |

The dropping funnel was filled with

| 103.9 g of monomer Composition I. |
|---|

After deaeration, the flask and the dropping funnel were brought under a nitrogen atmosphere. The contents of the flask were heated to 140° C., whereupon, with a temperature of 140° C. being maintained in the flask, the contents of the dropping funnel were added dropwise in 1 hour. Next, the reaction mixture was kept at this temperature for a further 3 hours, after which the contents of the flask were cooled to 100° C. and a homogeneous mixture of

| 4,3 g of N,N-dimethylethanolamine and |
|---|
| 480 g of demineralised water | was added over a period of 3 hours, while the temperature was gradually decreased from 100° C. to 30° C.

The properties of the thus obtained water borne polyester-polyacrylate hybrid dispersion are given in Table 1.

Example 2

In a manner analogous to that disclosed in Example 1, a polyester-polyacrylate hybrid dispersion was prepared, with the proviso that this time the flask was charged with:

| 300 g of Polyester A, |
|---|
| 14 g of the reaction product of 1 mole of alkoxypolyoxyethylene/ oxypropylene amine, Jeffamine ® M-1000 (PO/EO = 3/19. Mn = 1,176), and 1 mole of dimethyl-m-isopropenyl benzyl isocyanate (m-TMI), and |
| 20 g of 1-methoxypropanol-2, and | the dropping funnel was filled with 89.4 g of monomer Composition I. On conclusion of the reaction 3.7 g of N,N-dimethyl ethanolamine and 462 g of demineralised water were added to the contents of the flask. The properties of the obtained water borne polyester-polyacrylate hybrid dispersion are given in Table 1.

Example 3

In a manner analogous to that disclosed in Example 1, a polyester-polyacrylate hybrid dispersion was prepared, with the proviso that this time the flask was charged with:

| 310 g of Polyester A, |
|---|
| 14 g of the reaction product of 1 mole of alkoxypolyoxyethylene/ oxypropylene amine (Jeffamine ® M-1000) and 1 mole of dimethyl-m-isopropenyl benzyl isocyanate (m-TMI), and |
| 20 g of 1-methoxypropanol-2, and | the dropping funnel was filled with 79.0 g of monomer Composition I.

On conclusion of the reaction 3.3 g of N,N-dimethyl ethanolamine and 462 g of demineralised water were added to the contents of the flask. The properties of the obtained water borne polyester-polyacrylate hybrid dispersion are given in Table 1.

Example 4

In a manner analogous to that disclosed in Example 1, a polyester-polyacrylate hybrid dispersion was prepared, with the proviso that this time the flask was charged with:

| 320 g of Polyester A, |
|---|
| 14 g of the reaction product of 1 mole of alkoxypolyoxyethylene/ oxypropylene amine (Jeffamine ® M-1000) and 1 mole of dimethyl-m-isopropenyl benzyl isocyanate (m-TMI), and |
| 20 g of 1-methoxypropanol-2, and | the dropping funnel was filled with 68.6 g of monomer Composition I.

On conclusion of the reaction 2.8 g of N,N-dimethyl ethanolamine and 426 g of demineralised water were added to the contents of the flask. The properties of the obtained water borne polyester-polyacrylate hybrid dispersion are given in Table 1.

Example 5

In a manner analogous to that disclosed in Example 1, a polyester-polyacrylate hybrid dispersion was prepared, with the proviso that this time the flask was charged with:

---
330 g of Polyester A,
14 g of the reaction product of 1 mole of alkoxypolyoxyethylene/ oxypropylene amine (Jeffamine ® M-1000) and 1 mole of dimethyl-m-isopropenyl benzyl isocyanate (m-TMI), and
20 g of 1-methoxypropanol-2, and

--- the dropping funnel was filled with 58.2 g of monomer Composition I.

On conclusion of the reaction 2.4 g of N,N-dimethyl ethanolamine and 408 g of demineralised water were added to the contents of the flask.

The properties of the obtained water borne polyester-polyacrylate hybrid dispersion are given in Table 1.

Example 6

In a manner analogous to that disclosed in Example 2, a polyester-polyacrylate hybrid dispersion was prepared, with the proviso that this time Polyester B was substituted for Polyester A.

The properties of the obtained water borne polyester-polyacrylate hybrid dispersion are given in Table 1.

Example 7

In a manner analogous to that disclosed in Example 1, a polyester-polyacrylate hybrid dispersion was prepared, with the proviso that this time the flask was charged with:

---
280 g of Polyester B,
14 g of the reaction product of 1 mole of alkoxypolyoxyethylene/ oxypropylene amine (Jeffamine ® M-1000) and 1 mole of dimethyl-m-isopropenyl benzyl isocyanate (m-TMI), and
20 g of 1-methoxypropanol-2, and

--- the dropping funnel was filled with 109.4 g of monomer Composition II.

On conclusion of the reaction 3.4 g of N,N-dimethyl ethanolamine and 482 g of demineralised water were added to the contents of the flask.

The properties of the obtained water borne polyester-polyacrylate hybrid dispersion are given in Table 1.

Example 8

In a manner analogous to that disclosed in Example 6, a polyester-polyacrylate hybrid dispersion was prepared, with the proviso that this time Polyester C was substituted for Polyester B.

The properties of the obtained water borne polyester-polyacrylate hybrid dispersion are given in Table 1.

Example 9

In a manner analogous to that disclosed in Example 7 a polyester-polyacrylate hybrid dispersion was prepared, with the proviso that this time Polyester C was substituted for Polyester B.

The properties of the obtained water borne polyester-polyacrylate hybrid dispersion are given in Table 1.

Example 10

In a manner analogous to that disclosed in Example 1, a polyester-polyacrylate hybrid dispersion was prepared, with the proviso that this time the flask was charged with:

---
260 g of Polyester B,
14 g of the reaction product of 1 mole of alkoxypolyoxyethylene/ oxypropylene amine (Jeffamine ® M-1000) and 1 mole of dimethyl-m-isopropenyl benzyl isocyanate (m-TMI), and
20 g of 1-methoxypropanol-2, and

--- the dropping funnel was filled with 128.9 g of monomer Composition III.

On conclusion of the reaction 3.6 g of N,N-dimethyl ethanolamine and 564 g of demineralised water were added to the contents of the flask.

The properties of the obtained water borne polyester-polyacrylate hybrid dispersion are given in Table 1.

Example 11

In a manner analogous to that disclosed in Example 10, a polyester-polyacrylate hybrid dispersion was prepared, with the proviso that this time monomer Composition IV was substituted for monomer Composition III.

The properties of the obtained water borne polyester-polyacrylate hybrid dispersion are given in Table 1.

Example 12

In a manner analogous to that disclosed in Example 1, a polyester-polyacrylate hybrid dispersion was prepared, with the proviso that this time the flask was charged with:

---
260 g of Polyester D,
14 g of the reaction product of 1 mole of alkoxypolyoxyethylene/ oxypropylene amine (Jeffamine ® M-1000) and 1 mole of dimethyl-m-isopropenyl benzyl isocyanate (-TMI), and
30 g of 1-methoxypropanol-2, and

--- the dropping funnel was filled with 130 g of monomer Composition II. On conclusion of the reaction 3.6 g of N,N-dimethyl ethanolamine and 615 g of demineralised water were added to the contents of the flask. The properties of the obtained water borne polyester-polyacrylate hybrid dispersion are given in Table 1.

Example 13

In a manner analogous to that disclosed in Example 12, a polyester-polyacrylate hybrid dispersion was prepared, with the proviso that this time monomer Composition V was substituted for monomer Composition II.

The properties of the obtained water borne polyester-polyacrylate hybrid dispersion are given in Table 1.

Example 14

In a manner analogous to that disclosed in Example 1, a polyester-polyacrylate hybrid dispersion was prepared, with the proviso that this time the flask was charged with:

- 320 g of Polyester E,
- 14 g of the reaction product of 1 mole of alkoxypolyoxyethylene/oxypropylene amine (Jeffamine ® M-1000) and 1 mole of dimethyl-m-isopropenyl benzyl isocyanate (m-TMI),
- 40 g of 1-methoxypropanol-2, and
- 40 g of 2-butoxyethanol-1, and the dropping funnel was filled with 68.1 g of monomer Composition II.

On conclusion of the reaction 2.1 g of N,N-dimethyl ethanolamine and 446 g of demineralised water were added to the contents of the flask.

The properties of the obtained water borne polyester-polyacrylate hybrid dispersion are given in Table 1.

Example 15

In a manner analogous to that disclosed in Example 1, a polyester-polyacrylate hybrid dispersion was prepared, with the proviso that this time the flask was charged with:

- 332 g of Polyester E,
- 14 g of the reaction product of 1 mole of alkoxypolyoxyethylene/oxypropylene amine (Jeffamine ® M-1000) and 1 mole of dimethyl-m-isopropenyl benzyl isocyanate (m-TMI),
- 30 g of 1-methoxypropanol-2, and
- 30 g of 2-butoxyethanol-1, and the dropping funnel was filled with 55.7 g of monomer Composition II.

On conclusion of the reaction 1.75 g of N,N-dimethyl ethanolamine and 425 g of demineralised water were added to the contents of the flask.

The properties of the obtained water borne polyester-polyacrylate hybrid dispersion are given in Table 1.

Example 16

In a manner analogous to that disclosed in Example 1, a polyester-polyacrylate hybrid dispersion was prepared, with the proviso that this time the flask was charged with:

- 700 g of Polyester F,
- 35 g of the reaction product of 1 mole of alkoxypolyoxyethylene/oxypropylene amine (Jeffamine ® M-1000) and 1 mole of dimethyl-m-isopropenyl benzyl isocyanate (m-TMI),
- 50 g of 1-methoxypropanol-2, and the dropping funnel was filled with 273.5 g of monomer Composition II.

On conclusion of the reaction 9.3 g of N,N-dimethyl ethanolamine and 1,205 g of demineralised water were added to the contents of the flask.

The properties of the obtained water borne polyester-polyacrylate hybrid dispersion are given in Table 1.

Example 17

A 3 l flask equipped with a stirrer, a thermometer, a reflux condenser, and a dropping funnel was filled with:
- 647.3 g of Polyester G.

The dropping funnel was filled with 52.7 g of isophorone diisocyanate

After deaeration, the flask and the dropping funnel were brought under a nitrogen atmosphere. The contents of the flask were heated to 75° C., whereupon the contents of the dropping funnel were added dropwise in 30 minutes. Five drops of dibutyl tin diacetate were added and the reaction mixture was heated to 110° C. and stirred for 2 hours at this temperature. Next, the contents of the flask were cooled to 75° C. and a homogeneous mixture of

- 35 g of the reaction product of 1 mole of alkoxypolyoxyethylene/oxypropylene amine (Jeffamine ® M-1000) and 1 mole of dimethyl-m-isopropenyl benzyl isocyanate (m-TMI), and
- 80 g of 1-methoxypropanol-2.

was added.

The dropping funnel this time was filled with 273.5 g of monomer Composition II. After deaeration, the flask and the dropping funnel were brought under a nitrogen atmosphere. The contents of the flask were heated to 140° C., whereupon, with a temperature of 140° C. being maintained in the flask, the contents of the dropping funnel were added dropwise in 1 hour. Next, the reaction mixture was kept at this temperature for a further 3 hours, after which the contents of the flask were cooled to 100° C. and a homogeneous mixture of

- 9.3 g of N,N-dimethylethanolamine and
- 1,124 g of demineralised water was added over a period of 6 hours, while the temperature was gradually lowered from 100° C. to 30° C.

The properties of the thus obtained water borne polyester-polyacrylate hybrid dispersion are given in Table 1.

Example 18

In a manner analogous to that disclosed in Example 17, a polyester-polyacrylate hybrid dispersion was prepared, with the proviso that Polyester H was substituted for Polyester G.

The properties of the thus obtained water borne polyester-polyacrylate hybrid dispersion are given in Table 1.

Example 19

In a manner analogous to that disclosed in Example 1, a polyester-polyacrylate hybrid dispersion was prepared, with the proviso that this time use was made of a 3-liter flask charged with:

- 600 g of Polyester H,
- 35 g of the reaction product of 1 mole of alkoxypolyoxyethylene/oxypropylene amine (Jeffamine® M-1000) and 1 mole of dimethyl-m-isopropenyl benzyl isocyanate (m-TMI), and
- 50 g of 1-methoxypropanol-2, and the dropping funnel was filled with 373 g of monomer Composition VI.

On conclusion of the reaction 9.3 g of N,N-dimethylethanolamine and 1,431 g of demineralised water were added to the contents of the flask.

The properties of the obtained water borne polyester-polyacrylate hybrid dispersion are given in Table 1.

TABLE 1

| PE/PA dispersion of Example | polyester/polyacrylate resin | | | | Dispersion | | | |
|---|---|---|---|---|---|---|---|---|
| | OH number mg KOH/g | COOH number mg KOH/g | SO$_3$Na number mg KOH/g | wt % nonionic | pH | particle size (nm) | Viscosity (Pa · sec) | wt % solids |
| 1 | 187 | 16.7 | 6.1 | — | 7.2 | 95 | 0.55 | 44.0 |
| 2 | 184 | 15.0 | 5.2 | 3.0 | 7.3 | 72 | 0.67 | 45.0 |
| 3 | 187 | 13.9 | 4.6 | 3.0 | 7.5 | 75 | 0.60 | 45.0 |
| 4 | 189 | 12.9 | 4.0 | 3.0 | 7.4 | 88 | 0.49 | 47.0 |
| 5 | 192 | 11.8 | 3.4 | 3.0 | 7.5 | 101 | 0.68 | 48.0 |
| 6 | 184 | 11.8 | 5.2 | 3.0 | 7.8 | 118 | 0.54 | 45.0 |
| 7 | 178 | 11.8 | 5.3 | 3.0 | 7.8 | 67 | 1.94 | 44.0 |
| 8 | 152 | 15.5 | 5.3 | 3.0 | 7.5 | 162 | 0.64 | 39.5 |
| 9 | 148 | 15.4 | 5.3 | 3.0 | 7.4 | 119 | 0.86 | 40.0 |
| 10 | 172 | 11.2 | 4.5 | 3.0 | 8.2 | 57 | 1.36 | 40.0 |
| 11 | 172 | 11.3 | 3.7 | 3.0 | 8.2 | 115 | 0.69 | 40.0 |
| 12 | 144 | 13.3 | 6.3 | 3.0 | 7.8 | 71 | 1.64 | 38.0 |
| 13 | 144 | 12.0 | 5.7 | 3.0 | 8.0 | 77 | 1.52 | 38.0 |
| 14 | 283 | 6.6 | 3.3 | 3.0 | 7.9 | 82 | 1.60 | 43.0 |
| 15 | 290 | 5.4 | 2.7 | 3.0 | 8.0 | 135 | 0.98 | 45.0 |
| 16 | 233 | 13.6 | 5.3 | 3.0 | 7.4 | 85 | 1.50 | 44.0 |
| 17 | 140 | 13.0 | 5.3 | 3.0 | 7.7 | 88 | 1.21 | 45.0 |
| 18 | 191 | 13.4 | 5.3 | 3.0 | 7.8 | 79 | 1.13 | 45.0 |
| 19 | 212 | 12.6 | 4.4 | 3.0 | 7.8 | 73 | 0.46 | 41.0 |

Preparation of the Coating Compositions Examples 20 to 60

The aqueous polyester-polyacrylate hybrid dispersions (component A) were mixed with poly-functional isocyanate cross-linkers (component B) in a ratio NCO:OH=1.5:1 or NCO:OH=1:1. The hybrid dispersions were diluted with butyl glycol (10 wt. % on solids). The isocyanate components were diluted with methoxyisopropyl acetate (80 wt. % on solids). For the isocyanate cross-linkers use was made of two polyisocyanates commercially available from Bayer:

a) Desmodur LS 2025 (=Desmodur N3600) a hydrophobic isocyanurate based on 1,6-hexamethylene diisocyanate), and
b) Bayhydur LS 2032 (=Bayhydur N3100) a hydrophilic isocyanurate based on 1,6-hexamethylene diisocyanate, modified with about 12 wt. % of methoxypolyethylene oxide glycol).

LS 2032 and LS 2025 were used in a ratio of 1:1 or 2:1, based on NCO functionality.

No use was made of a catalyst.

The mixtures of polyester-polyacrylate hybrid resin dispersions and the isocyanate components were applied on glass panels in a dry layer thickness between 60 and 80 μm. The panels were allowed to dry at ambient (room) temperature (RT) for one week.

The Persoz Hardness was determined in accordance with French Industrial Standard method NF T30-016, the results being expressed in seconds.

The resistance to methylethyl ketone was determined by means of a rub test, whereas the resistance to skydrol (a phosphate ester component used as brake fluid in aeroplanes) was determined by immersing a coated sample for 500 hours at 70° C.

All coating layers exhibited excellent water resistance.

The properties of the obtained coating layers are given in Table 2.

TABLE 2

| Example | PE/PA Dispersion from Example | Isocyanate Component | Persoz Hardness (sec) | NCO/OH Ratio | Resistance to Methylethylketone more than 100 rubs with MEK | Resistance to Skydrol 500 hrs in skydrol at 70° C. |
|---|---|---|---|---|---|---|
| 20 | 1 | LS2025 | 270 | 1.5/1 | + | − |
| 21 | 2 | LS2025 | 250 | 1.5/1 | + | − |
| 22 | 3 | LS2025 + LS2032 1:1 | 155 | 1.5/1 | + | − |
| 23 | 4 | LS2032 | 84 | 1.5/1 | + | − |
| 24 | 5 | LS2025 + LS2032 1:1 | 145 | 1.5/1 | + | − |
| 25 | 6 | LS2025 | 230 | 1.5/1 | + | − |
| 26 | 7 | LS2025 + LS2032 1:1 | 167 | 1.5/1 | + | − |
| 27 | 8 | LS2025 + LS2032 1:1 | 152 | 1.5/1 | + | − |
| 28 | 9 | LS2025 + LS2032 1:1 | 160 | 1.5/1 | + | − |

TABLE 2-continued

| Example | PE/PA Dispersion from Example | Isocyanate Component | Persoz Hardness (sec) | NCO/OH Ratio | Resistance to Methylethylketone more than 100 rubs with MEK | Resistance to Skydrol 500 hrs in skydrol at 70° C. |
|---|---|---|---|---|---|---|
| 29 | 10 | LS2025 + LS2032 1:1 | 185 | 1.5/1 | + | − |
| 30 | 11 | LS2025 + LS2032 1:1 | 183 | 1.5/1 | + | − |
| 31 | 12 | LS2025 + LS2032 1:1 | 180 | 1.5/1 | + | − |
| 32 | 13 | LS2025 + LS2032 1:1 | 175 | 1.5/1 | + | − |
| 33 | 14 | LS 2025 | 260 | 1/1 | + | + |
| 34 | 15 | LS 2025 | 250 | 1/1 | + | + |
| 35 | 16 | LS2025 + LS2032 1:1 | 202 | 1.5/1.0 | + | + |
| 36 | 17 | LS2025 + LS2032 1:1 | 178 | 1.5/1.0 | + | − |
| 37 | 18 | LS2025 + LS2032 1:1 | 214 | 1.5/1.0 | + | + |
| 38 | 19 | LS2025 + LS2032 1:1 | 220 | 1.5/1.0 | + | + |

Mixtures of polyester-polyacrylate dispersions and the isocyanate components in an NCO:OH ratio of 1.5:1 without catalyst were diluted to spraying viscosity and applied in two layers as a clear coat on a water borne blue metallic base coat (Autowave®, ex Akzo Nobel) on an aluminium substrate. The clear coat layers were allowed to dry for 15 minutes, followed by drying at ambient temperature or at 60° C. for 45 minutes, resulting in a dry layer thickness between 50 and 90 μm. After one week at ambient (room) temperature the D.O.I. (distinction of image) and the gloss were measured in accordance with ASTM D-523 at 20°. A D.O.I. between 60 and 80 is acceptable, whereas a gloss value on a base coat at 20° of above 80 is considered high, while a gloss value at 20° of above 70 is considered acceptable. The results are given in Table 3.

TABLE 3

| Example | PE/PA dispersion from Example | Isocyanate Component | Curing temp. ° C. | Layer Thickness μm | D.O.I. Angle Units | Gloss 20° Gloss Units |
|---|---|---|---|---|---|---|
| 39 | 1 | LS2025 | RT | 70 | 84 | 86 |
| 40 | | | 60 | 82 | 57 | 86 |
| 41 | | LS2025 + LS2032 2:1 | RT | 73 | 89 | 87 |
| 42 | | | 60 | 79 | 77 | 85 |
| 43 | 2 | LS2025 | RT | 71 | 87 | 87 |
| 44 | | | 60 | 73 | 71 | 85 |
| 45 | 7 | LS2025 | RT | 66 | 84 | 86 |
| 46 | | | 60 | 63 | 62 | 84 |
| 47 | | LS2025 + LS2032 2:1 | RT | 55 | 85 | 87 |
| 48 | | | 60 | 59 | 85 | 88 |
| 49 | 9 | LS2025 + LS2032 2:1 | RT | 57 | 85 | 85 |
| 50 | | | 60 | 60 | 51 | 82 |
| 51 | 10 | LS2025 | RT | 54 | 42 | 76 |
| 52 | | | 60 | 54 | 27 | 52 |
| 53 | | LS2025 + LS2032 2:1 | RT | 71 | 87 | 87 |
| 54 | | | 60 | 70 | 76 | 86 |
| 55 | 11 | LS2025 + LS2032 2:1 | RT | 57 | 81 | 87 |
| 56 | | | 60 | 58 | 65 | 85 |
| 57 | 12 | LS2025 + LS2032 2:1 | RT | 50 | 75 | 84 |
| 58 | | | 60 | 50 | 39 | 77 |
| 59 | 13 | LS2025 + LS2032 2:1 | RT | 47 | 70 | 82 |
| 60 | | | 60 | 50 | 36 | 73 |

What is claimed is:

1. Aqueous-based cross-linkable binder composition comprising
   (A) an aqueous dispersion of a polyester-polyacrylate hybrid resin 50 to 90 wt. % of which is composed of polyester and 10 to 50 wt. % of which is composed of polyacrylate, which hybrid resin is obtainable by grafting a composition of radically polymerisable unsaturated monomers onto a partially unsaturated hydroxy-functional polyester resin, and
   (B) an organic polyisocyanate, wherein
   the partially unsaturated hydroxy-functional polyester has a hydroxyl value of 50 to 350, a COOH value of at most 10 mg KOH/g, and a number average molecular weight, optionally after chain extension with a polyisocyanate, of from 400 to 3,000, and is obtained by reaction of a mixture of polycarboxylic and, optionally, monocarboxylic acids, at least 50 mole % of such poly- and/or monocarboxylic acids are aliphatic acids with 6–12 carbon atoms, with one or more (cyclo)aliphatic alcohols comprising an aliphatic and/or a cycloaliphatic diol, wherein 0.5–6 mole % of the acids and/or alcohols are ethylenically unsaturated, and, optionally, a mono- and/or bisepoxide, and/or a tri- or higher-functional polyacid and/or polyalcohol, and the composition of radically polymerisable unsaturated monomers comprises a mixture of hydrophobic and hydrophilic monomers, wherein
(a) the hydrophobic monomers are selected from the group of aromatic vinyl compounds and (cyclo)alkyl(meth)acrylates with 4 or more carbon atoms in the (cyclo)alkyl group, and
(b) the hydrophilic monomers are selected from the group of (meth)acrylic acid, (meth)acrylamide, (meth)acrylonitrile, optionally substituted; unsaturated monomers containing a sulphonic acid salt group; hydroxyalkyl(meth)acrylates; and, optionally, unsaturated monomers containing nonionic groups such as $C_1$–$C_4$ alkoxy polyalkylene oxide groups, wherein the molar ratio of unsaturated carboxylic acid groups to unsaturated sulphonic acid groups is between 1:1 and 4:1, the molar ratio of components (a) to components (b) is between 1:2 and 3:1, the COOH value is between 20 and 80, and the $SO_3H$ value is between 10 and 40, and the carboxylic acid groups are at least partly neutralised.

2. A binder composition according to claim 1, wherein the sulphonic acids are selected from sodium dodecyl allyl sulphosuccinate, tert. ammonium salt of dodecyl allyl sulphosuccinate, styrene sulphonic acid, and sodium 2-acrylamido-2-methylpropane sulphonic acid.

3. A binder composition according to claim 1, wherein the tri- or higher-functional polyalcohol is selected from the group of 1,1,1-trimethylol propane, 1,1,1-trimethylol ethane, 1,2,3-trimethylol propane, and pentaerythritol.

4. A binder composition according to claim 1, wherein the hydroxyl value of the polyacrylate is between 40 and 250 mg KOH/g.

5. A binder composition according to claim 1, wherein the polyacrylate has a COOH value between 20 and 60 mg KOH/g, an $SO_3H$ value between 10 and 30 mg KOH/g, and comprises up to 15 wt. % of a nonionic group.

6. A binder composition according to claim 1, wherein the nonionic group is a polyalkoxy alkylene acrylate or a polyalkoxy alkylene methacrylate or the reaction product of 1 mole of $C_1$–$C_4$ alkoxy polyoxy ethylene/polyoxy propylene amine and 1 mole of dimethyl-m-isopropenyl benzyl isocyanate.

7. A binder composition according to claim 1, wherein the pH of the aqueous dispersion (A) is between 7 and 8.5.

8. A binder composition according to claim 1, wherein the NCO:OH equivalent ratio, based on the isocyanate groups of component (B) and the hydroxyl groups of component (A), is within the range of from 0.5:1 to 3:1.

9. A binder composition according to claim 1, wherein the isocyanate groups of component (B) are free isocyanate groups.

10. An aqueous-based coating, lacquer or sealing composition comprising the binder composition according to claim 1.

11. A composition according to claim 10, wherein said composition further comprises another type of polymer or polymer dispersion.

12. A composition according to claim 10, wherein said composition further comprises a reactive diluent.

13. A method of coating a substrate which comprises applying a coating composition according to claim 10 on a substrate, causing or allowing the aqueous-based carrier phase of the composition to be removed, and generating cross-linking of the coating that has been applied on the substrate.

14. A cross-linked coating which has been obtained from a coating composition according to claim 10.

15. A coated substrate which has been prepared according to the method of claim 13.

16. A method of using binder compositions according to claim 1 as binders for aqueous-based lacquers, coatings or sealing compounds.

* * * * *